BINARY DATA TRANSMISSION AND PULSE COUNTER

Filed June 4, 1964

United States Patent Office 3,466,606

Patented Sept. 9, 1969

3,466,606
BINARY DATA TRANSMISSION AND PULSE COUNTER

Andre Jean Henquet, Boulogne, Robert Victor Cavin, Paris, and Marcel Feuillepain, Ste.-Genevieve-des-Bois, France, assignors to International Standard Electric Corporation, New York, N.Y., a corporation of Delaware Filed June 4, 1964, Ser. No. 372,599
Claims priority, application France, June 12, 1963, 937,884
Int. Cl. H04q 3/04
U.S. Cl. 340—164 5 Claims

ABSTRACT OF THE DISCLOSURE

Pulses used to send dial information are also used to time system operations. The dial information is sent by binarily varying the amplitude of the timing pulses between a first and a second amplitude. This way a master station and a number of remote stations may communicate with each other on a two way basis.

This patent relates to a system for controlling remote equipments and more particularly to means for transmitting numbers in a timed code.

In known systems, timing signals are transmitted on a pair of wires as a continuous train of pulses of alternate signs, and received by relays alternately placed in two one-way circuits of opposite directions, so that operation of a relay by a timing pulse has no effect on the following relay during the same pulse. The contents of the code is transmitted on another pair of wires by means of pulses, the presence of which designs one binary value of the code elements while their absense (omission) designs the other binary value. These pulses may be all of the same sign.

In still other known systems, the code is superimposed on the timing signals, on a single pair of wires, by sending timing pulses of two different intensities for transmission of the two binary values of the code. These pulses are still of alternate signs for transmission of the timing signals.

Thus, in both of the above mentioned systems, each code moment corresponds to a timing pulse of either sign. The period of operation of the timer generator consists of two pulses of alternate signs, so that the duration of the said period is that of two code moments.

This invention offers a system wherein timing is transmitted through a continuous train of separate pulses of the same sign and receive by a simple counting circuit for separate pulses. Preferably, the transmitted pulses are of two different intensities in order to superimpose the code on the timing signals, on a single pair of wires.

This invention also offers a counting circuit for separate pulses of the same sign, comprising a chain of two-winding relays operating in two steps. In the first step of its operation each relay responds to a pulse applied to its first winding by establishing an energizing circuit through its second winding. This energizing circuit remaining inhibited, however, by a potential applied by the pulse. In the second step that comes after the pulse, the relay operates through the energizing circuit, which is no longer inhibited, to route the pulse-applying circuit to the next relay in the chain.

This counting circuit may receive remotely transmitted uniform pulses, or repeated pulses from a free running, pulse generator relay. In the preferred modification of this invention, where the code is superimposed on the timing signals by using pulses of two intensities, the counting circuit will receive repeated pulses from a timing pulse relay responding to pulses of both intensities.

Other features and advantages of the invention will appear in the description that will now be made of one embodiment with reference to the attached drawing wherein.

Figure 1:
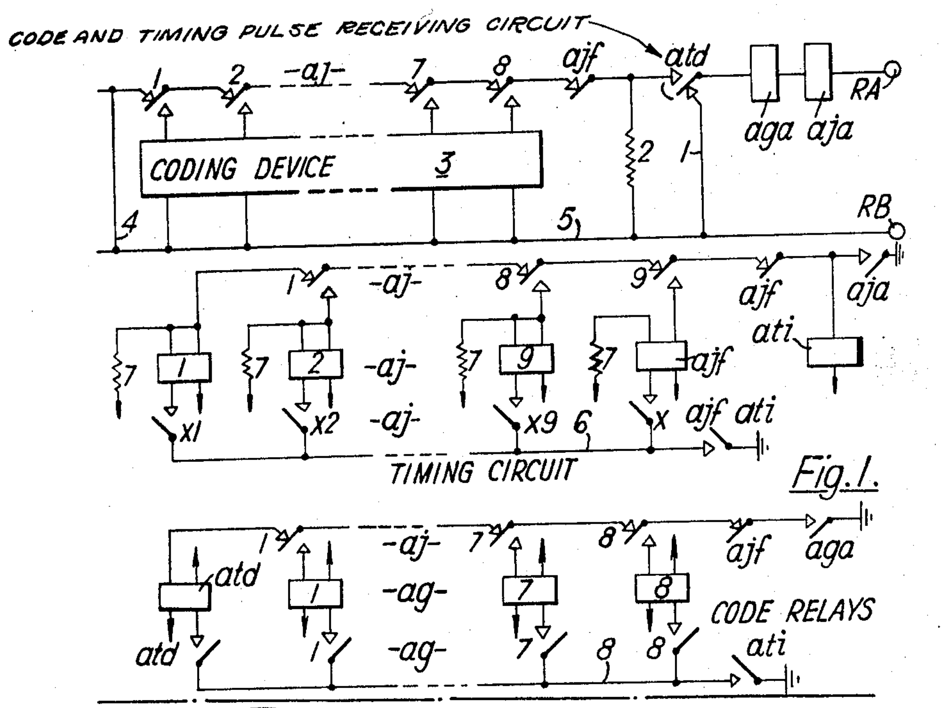
FIG. 1 shows a distant station connected to a code transmission line.
Figure 2:
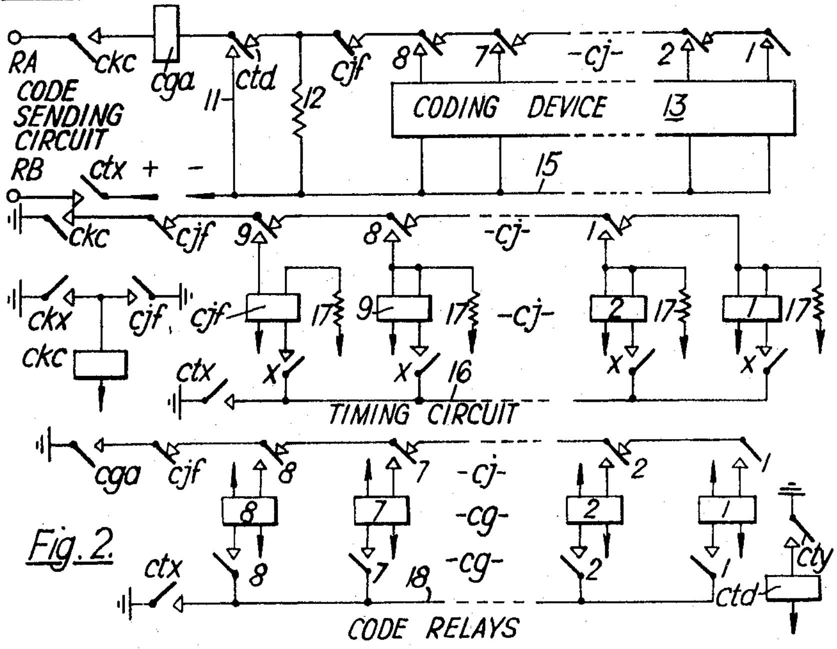
FIG. 2 shows a local station where timing pulses originate connected to the other end of the line.

The circuitry of FIG. 1 constitutes a remote timing pulse and code receiving circuit connected to one end of a transmission line RA, RB. The circuitry of FIG. 2 constitutes a timing pulse originating code receiving and transmitting circuit connected to the other end of the transmission line RA, RB. On each end of the line, there are three circuits: the uppermost circuit sends or receives timing and coded pulses, the middle circuit decodes timing pulses and in FIGURE 2 generates timing pulses and the lowermost circuit decodes the signals of the message.

Briefly, a continuous train of uniform, low voltage pulses are sent over the line RA, RB to provide a common time base. When a message signal is to be sent, a coded series of voltage pulses is superimposed upon the low voltage pulses to provide a coded series of high voltage pulses. Thus, the message is a binary coded train of high voltage pulses. At the receiving end of the line, a marginal relay and a regular relay are connected in series to be operated by the pulses. The regular relay responds to all pulses for providing a time base or a train of clock pulses. The marginal relay responds to the binary coded pulses to detect the message.

At the top of FIG. 1, a pulse-receiving circuit is connected to a distant end of a transmission line RA–RB. Starting from terminal RA, this circuit comprises the timing relay *aja* (a sensitive relay responding to pulses of both intensities). Code relay *aga* (a marginal relay responding only to contact *x* operates immediately after the first step and without waiting for the end of the pulse. It will be recalled that the end pulse is somewhat in the nature of a comparatively long marking that must cover various "end-of-transmission" operations. The end of this marking signals the release of the transmission circuit.

The start pulse reaches the first winding of relay *aj*.1 which operates through the first step of its operation. The relay closes its preliminary or advanced contact *x* to establish the circuit of its second winding, and then it awaits the end of the start pulse. After this pulse, the circuit is free from any inhibition and operates the relay (second step), thus switching the changeover contacts of this relay in the various chains. The second pulse will reach and operate relay *aj*.2 in the first step, and so on. The end pulse (the 10th in this case) will reach and operate end relay *ajf* through the first step; however, as has been seen, this relay also operates immediately through the second step to cut off the entire chain of change-over contacts at its rest contact preceding the chain. When the end pulse ceases, the seizing relay *at*1 slowly restores to cut the supply off holding wire 6; this releases all moment relays *aj*.1–9 and *ajf*.

The decoding circuit will be recognized at the bottom of FIG. 1. The code relay *aga*, which repeats the strong pulses only, applies pulses to a chain of change-over contacts identical with that of the timing receiver circuit, except that it does not include the change-over contact of the last relay, *aj*.9. The relays *atd* and *ag*.1–8 are connected to this chain through their first windings. Relay *atd* which determines the direction of transmission (it is operated by a strong start pulse for transmission of a number formed in the decoding device 3) is connected to the end of the chain. Code relays *ag*.1–8 are respectively connected to change-over contacts *aj*.1–8; relay *ag*.1 thus operates on the second pulse (the first one after the start pulse) and relay *ag*.8 on the ninth. All these relays lock as soon as they operate, through their second windings, on locking wire 8 to which a make contact of seizing relay *ati* applies a ground. These relays will restore on the release of relay *ati* after transmission.

The functioning of these circuits may be summarized as follows. The first pulse transmitted by line RA–RB always finds the short-circuit connection 1. Relay *aja* operates in any case and actuates relay *aj*.1 through the first step of operation. When the number is to come from the local equipment (coding device 13, FIG. 2) the start pulse is weak and relay *aga* remains in the rest condition. The following pulses will continue to find short-circuit connection 1 and relay *aga* will operate on strong pulses at the moments determined by the local equipment shown in FIG. 2, as will be seen later on. When the number is to come from the coding device 3 of the remote equipment (FIG. 1), the start pulse is strong, relay *aga* operates and actuates relay *atd*. Relay *atd* switches its change-over contact in the pulse-receiving circuit, and short-circuit connection 4 is substituted for short-circuit connection 1 without interruption. After this start pulse, relay *aj*.1 operates through its second step and switches its change-over contacts in the three circuits. The following pulse (2nd) passes through the first element of coding device 3 which determines its intensity. If the said element is open, the pulse goes through resistor 2 and is weak; relay *aja* operates alone. If the element is short-circuited, the pulse is strong and relay *aga* also operates. The pulse repeated by relay *aja* operates relay *aj*.2 through the first step. When this pulse is strong it is also repeated by relay *aga* which operates code relay *ag*.1. Operation thus proceeds until the 9th pulse which operates relay *aj*.9 through the first step, and also operates code relay *ag*.8 if it is strong, depending on the condition of the 8th, and last, element of coding device 3. After this pulse, relay *aj*.9 operates through the second step and switches its change-over contact in the timing receiver chain. The 10th pulse (a weak one in the example illustrated by FIG. 2, but it might be a strong one) operates relay *aja* which actuates end relay *ajf*. The latter cuts off the three chains of change-over contacts. After this last pulse (which may be longer than the others, as already seen) relay *aja* falls back, followed by slow relay *ati* and relays which were locked on wires 6 and 8 in the timing and code-receiving circuits. The remote transmitting equipment is thus released.

In the local equipment, FIG. 2, one finds again the three circuits of FIG. 1, with some peculiarities resulting from the fact that it is this equipment which produces the timing pulses. Timing is provided by relay *ckc*, periodically operated by a timer circuit, an example of which will be found in the main patent, symbolically represented here by contact *ckx*. A positive battery is directly applied to wire RB, for the duration of transmission, by symbolical contact *ctx*. The pulse-receiving circuit is supplied by a negative battery connected to its return wire 15 and is periodically connected to wire RA by a make contact of relay *ckc*. Like the circuit of FIG. 1, this circuit comprises a short-circuit connection 11, a resistor 12, and a coding device 13, all connected to return wire 15 through a chain of contacts comprising a change-over contact of "direction-of-transmission" relay *ctd*, a rest contact of "end-of-transmission" relay *cjf*, and the change-over contacts of moment relays *cj*.1–8. This circuit, however, does not comprise any short-circuit connection similar to connection 4 of FIG. 1, nor any timing relay similar to relay *aja*, and the position of change-over contact *atd* since relays *atd* and *ctd* operate together, and, if one of them cuts off the short-circuit connection to insert the coding device, the other must, on the contrary, maintain the short-circuit connection to exclude the coding device. The timing receiver circuit is the same as that of FIG. 1 except that the pulses are directly applied through a contact of relay *ckc* and that locking wire 16 is supplied, during the transmission period, through another symbolical contact *ctx*. The code receiver circuit is the same as that of FIG. 1 except that it does not comprise the "direction-of-transmission" relay *ctd* which is separately operated through a symbolical contact *cty* during the transmission period when the number transmitted is to come from the remote equipment, and that locking wire 18 is supplied during the transmission period through still another symbolical contact *ctx*.

The functioning of these circuits may be summarized as follows. The start pulse is provided by the first operation of relay *ckc*. If the number is to come from the local equipment (FIG. 2), relay *ctd* remains in the rest condition, the start pulse goes through resistor 12 and, therefore, is weak; in the remote equipment (FIG. 1) relays *aga* and *atd* will not operate. The following pulses will be determined by coding device 13 and will go through short-circuit connection 1 in the remote equipment. If the number is to come from the remote equipment (FIG. 1), relay *ctd* has been placed in the work condition, the start pulse goes through short-circuit connection 11 and, therefore, is strong; it operates relay *aga* and *atd* in the remote equipment (relay *cga* simultaneously operates in the local equipment but without effect at this time). The following pulses will be determined by coding device 3 (FIG. 1) and will go through short-circuit connection 11.

The 10th pulse operates relay *cjf* which applies a locking ground to relay *ckc* to maintain the pulse marking on line RA–RB independently of the timing through symbolical contact *ckx*. When all "end-of-transmission" operations have been completed, symbolical contacts *ctx* open and the transmission device is released at the same time as the suppression of the final marking releases the remote transmission device (FIG. 1).

While the principles of this invention have been described above in connection with particular embodiments it is to be clearly understood that this description has been made only by way of example and not as a limitation to the scope of the invention.

We claim:

1. A code transmission circuit comprising a two wire transmission line having at least one local station and one distant station attached at opposite ends thereof, said local station having means for sending a continuous train of timing pulses of the same polarity over said line, repeating relay means at said distant station operated responsive to said timing pulses for receiving said timing pulses, attenuating means at each of said stations, pulse coding means at each of said stations for controlling said attenuating means to selectively attenuate said timing pulses to generate binary coded pulses having attenuated and unattenuated amplitudes, marginal relay means at each of said stations operated responsive to said timing pulses having unattenuated amplitudes for binarily receiving said coded signals, timing pulse counting means at each of said stations operated responsive to the operation and release of said repeating relay to provide time slots at each of said stations for receiving said coded signals, said timing pulse counting means comprising a chain of two step relays, means responsive to the operation of said repeating relay means for operating one of said two step relays to its first step, means responsive to the release of said repeating relay means for operating said one relay to its second step and for preparing the next two step relay in said chain for operation, decoding means comprising a chain of decoding relays, and means for selectively individually operating each decoding relay of said chain of decoding relays responsive to the operation of said marginal relay during one of said time slots for decoding said coded signal.

2. The code transmission circuit of claim 1 wherein said pulse coding means comprises coding device shorting means including contacts on said two step relays for shorting said attenuating means to selectively attenuate said timing pulses.

3. The code transmission circuit of claim 2 wherein said timing pulse counting means of said remote station comprises slow to release seizing relay means, and means responsive to the operation of said seizing relay means for applying a locking ground for said two step relays and for said decoding relays.

4. The code transmission circuit of claim 3 wherein said local station comprises a directional control relay for selecting the pulse coding means of either said local station or said remote station, means responsive to said directional control relay in an unoperated condition for selecting the coding device shorting means of said local station to selectively short said timing pulses, and means responsive to said directional control relay in an operated condition for shorting said attenuating means in said local station and connecting the attenuating means of said distant station to said coding device means of said distant station.

5. The code transmission circuit of claim 4 wherein a distant directional relay is provided at said distant station, and means for operating said distant directional relay responsive to the operation of said marginal relay at the first timing pulse when said directional control relay at said local station operates.

References Cited

UNITED STATES PATENTS

| | | | |
|---|---|---|---|
| 2,428,028 | 9/1947 | Joly et al. | |
| 2,444,039 | 6/1948 | Goddard. | |
| 2,512,639 | 6/1950 | Gohorel. | |
| 3,059,223 | 10/1962 | Bell. | |
| 3,179,889 | 4/1965 | King ____________ | 340—170 XR |

DONALD J. YUSKO, Primary Examiner

U.S. Cl. X.R.

340—172